United States Patent [19]

Thate

[11] 4,227,702
[45] Oct. 14, 1980

[54] INFLATABLE SEALING DEVICE

[75] Inventor: Kurt Thate, Munich, Fed. Rep. of Germany

[73] Assignee: AGFA-Gevaert, A.G., Leverkusen, Fed. Rep. of Germany

[21] Appl. No.: 970,193

[22] Filed: Dec. 18, 1978

[51] Int. Cl.² ............................................. F16J 15/46
[52] U.S. Cl. ................................ 277/34.3; 277/226; 250/315.2
[58] Field of Search ................... 277/34, 34.3, 34.6, 277/226; 250/315 A

[56] References Cited

U.S. PATENT DOCUMENTS

| | | | |
|---|---|---|---|
| 2,720,011 | 10/1955 | Krupp | 277/34 X |
| 2,785,824 | 3/1957 | Reeves | 277/34 X |
| 3,171,381 | 3/1965 | Meek | 277/34 X |
| 3,178,779 | 4/1965 | Clark et al. | 277/34 X |
| 3,337,222 | 8/1967 | Smith et al. | 277/34.3 |
| 3,491,825 | 1/1970 | Peterson et al. | 277/34.3 X |
| 3,967,674 | 7/1976 | Fort | 277/34 X |
| 4,021,668 | 5/1977 | Pfeifer et al. | 250/315 A |
| 4,086,806 | 5/1978 | Covey et al. | 277/34 X |
| 4,125,088 | 11/1978 | Hong et al. | 277/34 X |
| 4,135,698 | 1/1979 | Thate et al. | 250/315 A X |

FOREIGN PATENT DOCUMENTS

| | | | |
|---|---|---|---|
| 634680 | 1/1962 | Canada | 277/34.3 |
| 776205 | 6/1957 | United Kingdom | 277/34 |
| 236926 | 11/1969 | U.S.S.R. | 277/34.3 |

*Primary Examiner*—Robert S. Ward, Jr.
*Attorney, Agent, or Firm*—Peter K. Kontler

[57] ABSTRACT

A circumferentially complete seal is received in a circumferentially complete groove machined into a surface of a first member forming part of an ionography imaging chamber. The surface of the first member is separated from a surface of a second member of the imaging chamber by a clearance which occasionally connects the interelectrode gap of the imaging chamber with the atmosphere. The seal has an inflatable elastic inner section adjacent to the bottom of the groove and a reciprocable second section which resembles a plunger and is moved from the groove, across the clearance and into sealing engagement with the surface of the second member in response to inflation of the first section. The latter contains a strip-shaped connector which is bolted to the first member to deform a portion of the first section into sealing engagement with the surface at the bottom of the groove. The second section is also a tube which contains a reinforcing insert and has a sealing lip adjacent to the interelectrode gap and sealingly engaging the surface of the second member in response to inflation of the first section. The width of the second section exceeds the width of the clearance and the thickness of the second section is at least twice the width of the clearance. When the first section is deflated, the width of the seal is slightly less than the width of the groove.

14 Claims, 2 Drawing Figures

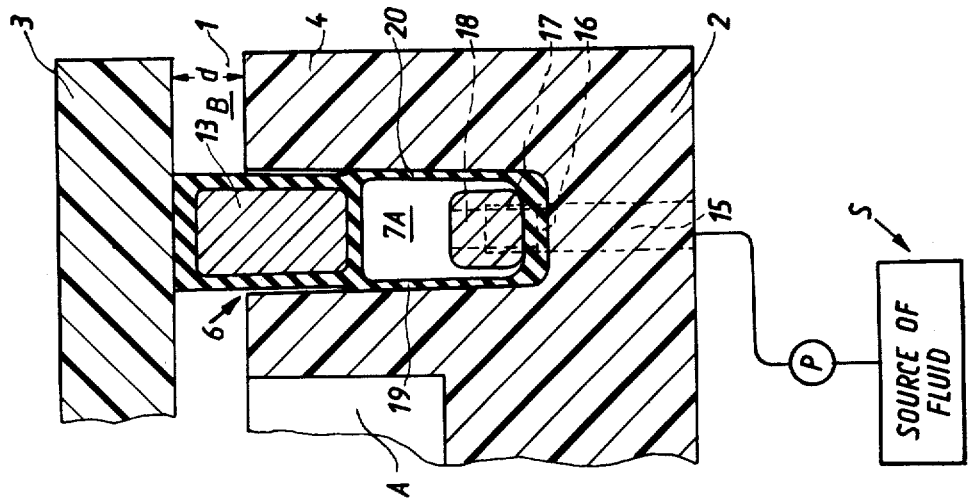
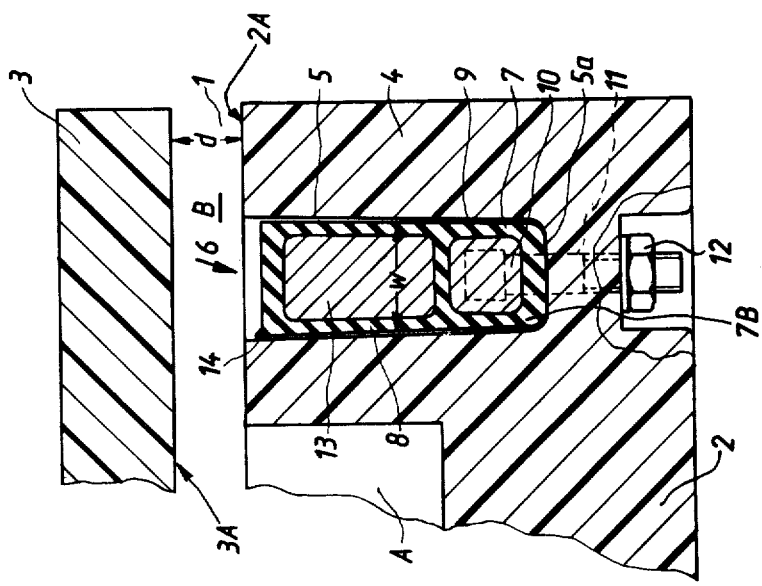

INFLATABLE SEALING DEVICE

CROSS-REFERENCE TO RELATED APPLICATION

The sealing device of the present invention constitutes an improvement over and a further development of the sealing device which is disclosed in the commonly owned copending application Ser. No. 768,539 filed Feb. 14, 1977 by Kurt Thate et al., now U.S. Pat. No. 4,135,698 granted Jan. 23, 1979.

BACKGROUND OF THE INVENTION

The present invention relates to sealing devices in general, and more particularly to improvements in inflatable sealing devices. Still more particularly, the invention relates to improvements in inflatable seals which can establish or terminate a sealing action between two spaces, chambers or other areas which are maintained at different pressures. Typical examples of apparatus wherein the sealing device of the present invention can be put to use are ionography imaging chambers wherein dielectric receptor sheets are provided with latent images of X-rayed objects in an interelectrode gap while the gap is filled with a compressed high Z gas, such as Freon, Xenon or Krypton. During imaging of an object onto the receptor sheet in the interelectrode gap, the gap must be sealed from the surrounding atmosphere in order to prevent escape of high Z gas which is maintained well above atmospheric pressure, e.g., at a pressure of 6 to 20 atmospheres above normal atmospheric pressure.

It is already known to seal the interelectrode gap of an ionography imaging chamber from the surrounding atmosphere by resorting to inflatable elastic sealing devices. For example, German Offenlegungsschrift No. 25 40 404 discloses a hollow cylindrical seal which is inserted into a circumferential groove of one section or member of the housing of the ionography imaging chamber so that it surrounds the interelectrode gap. When the seal is expanded from within, it extends across the adjacent portion of the clearance which connects the interelectrode gap with the atmosphere and engages another section or member of the housing of the imaging chamber to thus prevent escape of the high Z gas which is admitted into the gap as soon as the expansion or inflation of the seal is completed. A drawback of such sealing devices is that they cannot adequately seal a relatively wide clearance, especially if the pressure differential at the opposite sides of the inflated seal is very high. This is due to the fact that the force with which a readily deformable cylindrical hose-like seal engages the surface of the other member of the housing of the imaging chamber is relatively small and also that, when the clearance is rather wide and the pressure differential is pronounced, the readily deformable seal undergoes pronounced deformation under the action of compressed high Z gas. In other words, the mechanical stability of an inflatable cylindrical seal is much too low to insure the establishment of a reliable sealing action in response to admission of highly compressed high Z gas into the gap between the electrodes of the imaging chamber. Moreover, the useful life of the just described seal is short and the interval which is required for its inflation is rather long so that the preparation of the imaging chamber for the making of a latent or visible image of an X-rayed object consumes a substantial amount of time.

OBJECTS AND SUMMARY OF THE INVENTION

An object of the invention is to provide a novel and improved sealing device which can be used to establish a fluidtight seal between two components or members which are separated from each other by a wide or narrow clearance, whose useful life is longer than that of presently known sealing devices, which can be installed in and can form part of existing ionography imaging chambers to seal the interelectrode gap from the surrounding atmosphere, and which can be rapidly inflated or deflated in a highly reproducible way.

Another object of the invention is to provide a sealing device which can establish a reliable sealing action between two spaces which are maintained at widely different pressures, which reliably prevents uncontrolled escape of expensive high Z gas from the interelectrode gap of an ionography imaging chamber, and which can be readily adjusted or its component parts replaced with little loss of time.

A further object of the invention is to provide a sealing device of the above outlined character which can automatically compensate for possible deviations of the width of the clearance to be sealed from optimum width, which can be inflated and deflated with little loss of time, and which can be activated or rendered inoperative at frequent intervals.

Another object of the invention is to provide a sealing device which can be installed in existing ionography imaging chambers as an inexpensive and superior substitute for heretofore known sealing devices.

A further object of the invention is to provide a radiographic apparatus which embodies a sealing device of the above outlined character.

The invention is embodied in a device for sealing a clearance between a first space and a second space wherein the pressure exceeds, at least at times, the pressure in the first space, particularly for sealing by separating the interelectrode gap of an ionography imaging chamber from the surrounding atmosphere, i.e., for sealing the clearance which is provided in the imaging chamber for introduction of dielectric receptor sheets into and for removal of such sheets from the interelectrode gap. The sealing device comprises first and second members (such members may constitute two discrete components of the housing of an ionography chamber which are spaced apart from each other to define the aforementioned clearance) respectively having first and second surfaces disposed at the opposite sides of the clearance, a recess provided in the surface of one of the members and extending substantially transversely of and communicating with the clearance, a seal mounted in the recess and including a deformable (preferably elastic) hollow tubular first section which is remote from the clearance and a second section nearer to the clearance (the second section is movable in the recess toward and away from the surface of the other member), and means for selectively admitting a pressurized fluid (e.g., air or $CO_2$ gas) into the first section to thereby inflate the first section with attendant movement of the second section across the clearance and into sealing engagement with the surface of the other member. The second section can be said to constitute a plunger or ram which is reciprocable in the recess toward and away from the other member and is preferably fully received in the recess when the first section is deflated, either as a result of evacuation of fluid from its interior or as a result of automatic contraction as soon as a path is established for the escape of pressurized fluid from its interior.

The seal preferably further comprises a solid and rigid connector (e.g., a strip-shaped insert) in the internal compartment of the first section and threaded members or analogous fastening means for coupling the connector with the one member, preferably in such a way that the connector urges a portion of the first section into sealing engagement with the surface bounding the innermost or deepmost portion of the recess. The internal compartment of the first section is preferably filled or nearly filled by the connector when the first section of the seal is deflated.

The novel features which are considered as characteristic of the invention are set forth in particular in the appended claims. The improved sealing device itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 1 is a fragmentary sectional view of an ionography imaging chamber including a sealing device which embodies one form of the invention and wherein the first section of the seal is shown in deflated condition; and FIG. 2 is a similar sectional view but showing the first section of the seal in inflated condition.

DESCRIPTION OF THE PREFERRED EMBODIMENTS

The sealing device which is shown in the drawing can be used as a substitute for sealing devices of the type shown in FIG. 4 of commonly owned U.S. Pat. No. 4,021,668 granted May 3, 1977 to Pfeifer et al. This patent further shows an ionography imaging chamber wherein the inflatable sealing device can temporarily seal a clearance between an interelectrode gap and the surrounding atmosphere. To the extent which is necessary for better understanding of the present invention, the disclosure of the patent to Pfeifer et al. is incorporated herein by reference.

FIG. 1 shows the seal 6 of the sealing device in its deflated or inoperative position. This seal is installed in a groove 5 which is machined into the surface 2A of a first member 2 of the housing of an ionography imaging chamber. The purpose of the seal 6 is to close, at times, a clearance 1 which is provided between the surface 2A of the member 2 and the adjacent surface 3A of a second member or lid 3 of the housing of the imaging chamber. When a section 7 of the seal 6 is inflated in a manner as shown in FIG. 2, it seals a gap A (plenum chamber) from a space B which is maintained at atmospheric pressure or at a pressure substantially lower than in the gap or space A. The lid 3 is secured to the member 2 by bolts, screws or other suitable fasteners, not shown, so as to establish the clearance 1 which is necessary to allow for introduction of dielectric receptor sheets into or for withdrawal of such sheets from the gap A. The nature of the dielectric receptor sheets, the remaining details of the imaging chamber, and the nature of the high Z gas which can be used to fill the gap A during imaging of X-rayed objects onto a receptor sheet in the gap are fully disclosed in the aforementioned patent to Pfeifer et al.

The groove 5 is machined into the marginal portion 4 of the member 2 and can extend all the way around the gap A, i.e., the groove 5 may constitute a circumferentially complete recess which extends inwardly from the surface 2A, i.e., in a direction away from the gap 1 and the surface 3A. It is assumed that the groove 5 has a substantially square or rectangular outline. The seal 6 is also a circumferentially complete body of a square or rectangular cross-sectional outline and resembles a frame fitting into and normally fully received in the groove 5.

The elastically deformable part of the seal 6 consists or may consist of silicone and includes a lower or inner section 7 which resembles a circumferentially complete hose and an upper or outer section 8 which is also a circumferentially complete hose and can be said to constitute a polygonal plunger or ram which bears against the surface 3A when the section 7 is inflated in a manner as shown in FIG. 2. In the illustrated embodiment, the elastic sections 7 and 8 of the seal 6 are integral with each other.

The internal compartment 7A of the elastic section 7 contains a strip-shaped connector or insert 9 which can be made of cast resin, solid synthetic plastic material or a metallic material. The connector 9 serves to insure that the elastic sections of the seal 6 are secured to the member 2 as well as that the innermost part or wall 7B of the hose-like elastic section 7 is maintained in sealing engagement with the bottom surface 5a of the groove 5. The dimensions of the connector 9 are preferably selected in such a way that the connector 9 completely or nearly completely fills the compartment 7A in deflated condition of the section 7 (see FIG. 1). The means for attaching or fastening the connector 9 to the member 2 comprises several threaded fasteners in the form of screws or bolts 10 whose shanks extend through bores or holes 11 of the member 2 and mesh with nuts 12 which are accessible at the underside of the member 2. By tightening the nuts 12, an attendant can move the wall 7B of the section 7 into strong sealing engagement with the surface 5a in the groove 5. It is preferred to provide the underside of the section 7 with annular protuberances which surround the holes 11 to further reduce the likelihood of the leakage of high Z gas from the gap A into the surrounding atmosphere. Such protuberances are not specifically shown in the drawing; they are flattened in response to tightening of the nuts 12 to insure that the entire underside of the wall 7B can lie flat against the surface 5a.

The section 8 of the seal 6 contains a reinforcing or stiffening insert 13 which may consist of a metallic or synthetic plastic material or of cast resin and whose purpose is to limit the extent of deformation of the section 8 when the section 7 is inflated (FIG. 2) to thereby urge the section 8 into sealing engagement with the surface 3A. If desired, the section 8 can be provided with a deformable sealing lip 14 at that side of the seal 6 which is nearer to the gap A. The lip 14 is a circumferentially complete element which surrounds the entire gap A.

The dimensions of the seal 6 are selected in such a way that it does not extend beyond the groove 5 in the deflated condition of the section 7. Actually, and as shown in FIG. 1, the section 8 of the seal 6 can be fully confined in the groove 5 so that the lip 14 does not extend outwardly beyond the surface 2A and into the clearance 1 in deflated condition of the section 7. Furthermore, the width w of the seal 6 (as measured in the direction transversely of the groove 5) is preferably slightly less than the corresponding dimension (width) of the groove so that the section 8 does not encounter any, or encounters only minimal, resistance to its movement toward or away from sealing engagement with the surface 3A. Furthermore, and in order to enhance the stability of the seal 6, the width w of this seal preferably exceeds the width d of the clearance 1, and the thickness of the section 8 (as measured at right angles to the surface 2A) is at least twice the width d.

FIG. 2 shows that the member 2 of the housing of the imaging chamber is formed with channels 15 for the admission or evacuation of a fluid (e.g., air or another inert gas, such as CO2 gas) which is used to inflate the section 7. The channels 15 communicate with openings 16 in the wall 7B of the section 7, and such openings in turn communicate with tubular nipples 17 which are installed in the connector 9. The nipples 17 can admit the pressurized fluid into the compartment 7A via bores 18 in the upper part of the connector 9. The bores 18 are coaxial with the respective nipples 17. Several nipples 17, bores 18, channels 15 and openings 16 are provided at regular intervals along the full length of the connector 9 and section 7. Such arrangement insures uniform inflation of the entire section 7 when the seal 6 is to engage the lid 3 of the housing of the imaging chamber.

The means for selectively admitting pressurized fluid into the compartment 7A comprises one or more pumps P which draw air from the atmosphere or from a suitable source S of fluid (e.g., an inert gas other than air). When the pump or pumps P are started to admit pressurized fluid into the channels 15, the section 7 is inflated and the parts 8, 13 act not unlike a plunger or ram which moves upwardly beyond the surface 2A and sealingly engages the surface 3A. The section 7 expands primarily or exclusively in the direction toward the lid 3; however, and as shown in FIG. 2, the side walls 19 and 20 of the section 7 also expand laterally to sealingly engage the adjacent surfaces in the groove 5 and to thus further reduce the likelihood of escape of high Z gas from the gap A via groove 5.

It has been found that the improved sealing device can readily withstand substantial pressure, i.e., that the seal 6 can properly seal the gap A from the space B even if the pressure differential between A and B is in the range of several atmospheres, e.g., 10–20 atmospheres. The main sealing action is furnished by the lip 14 and by the adjacent part of the section 8. Since the lip 14 is relatively narrow, it is caused to bear against the surface 3A with a pronounced force which is fully capable of preventing leakage of the high Z gas from the gap A. FIG. 2 further shows that the thickness or height of that portion of the plunger or ram 8, 13 which remains in the groove 5 when the lip 14 sealingly engages the surface 3A can exceed the width d of the clearance 1; this enhances the stability of the seal 6 in the inflated condition of the section 7. Stability of the seal 6 is further enhanced due to the fact that the interior of the section 8 is filled with the material of the solid reinforcing insert 13. The provision of such a reinforcing insert insures the establishment of a satisfactory sealing action regardless of the magnitude of the pressure differential between the gap A and space B. The sealing action is just as satisfactory when the clearance 1 is very wide or rather narrow. This is important in ionography imaging chambers because, when the pressure in the gap A is raised to between 10 and 20 atmospheres above atmospheric pressure, the width of the clearance 1 can increase considerably because the compressed gas in the gap A causes the lid 3 to bulge outwardly. For example, the width d of the clearance 1 in the deflated condition of the section 7 may be approximately 4 millimeters; such width often increases to 8 mm or even more when the pressure in the gap A is increased as a result of admission of compressed high Z gas.

An important advantage of the improved sealing device is that the compartment 7A of the section 7 is completely or nearly completely filled by the material of the connector 9 when the section 7 is deflated. This means that the section 7 begins to expand in immediate response to admission of the pressurized fluid via channels 15. In other words, all of the fluid which is supplied by the pump or pumps P is used for expansion of the seal 6 in a direction toward the surface 3A. Consequently, the quantity of the pressurized fluid which is needed to adequately inflate the section 7 is very small so that the sealing device can operate properly by resorting to one or more small pumps and so that the sealing device furnishes a reliable sealing action after the elapse of only a short interval subsequent to commencement of admission of the pressurized fluid into the channels 15. The same applies for the evacuation of fluid from the section 7, i.e., such evacuation takes up little time and allows for the withdrawal of an exposed dielectric receptor sheet from the gap A practically immediately after the exposure of such sheet to object-modulated X-rays.

As mentioned above, the illustrated seal 6 is assumed to resemble a polygonal (rectangular or square) frame which completely surrounds the gap A. It goes without saying that the seal need not be circumferentially complete or that it can be assembled of two or more components disposed end-to-end. A circumferentially complete polygonal seal exhibits the advantage that it can be produced at a low cost. The feature that the expansion of side walls 19, 20 of the section 7 in response to admission of fluid via channels 15 is small or negligible insures that the section 7 can stand long periods of use. Moreover, the section 7 automatically and rapidly reassumes the deflated condition of FIG. 1 in immediate response to the connection of the channels 15 with the atmosphere or with a receptacle for collection of the fluid which is used for inflation of the section 7. Therefore, the ram 8, 13 is invariably retracted into the groove 5, even after a substantial number of inflations of the section 7, to thus insure unimpeded withdrawal or insertion of receptor sheets into the imaging chamber.

Reliable sealing action of the seal 6 is attributable to the fact that the readily deformable and inflatable section 7 of the seal is remote from the clearance 1 and surface 3A of the lid 3. Thus, the sealing action across the clearance 1 is furnished by a much more stable part including the section 8 and the insert 13; such part acts not unlike a bolt which is reciprocable in the groove 5 in response to inflation and deflation of the section 7. When the section 7 is inflated in response to admission of pressurized fluid (which can be a liquid or a gas) into the compartment 7A, the upper wall of the section 8, and especially the lip 14, is caused to sealingly engage and to remain in satisfactory sealing engagement with the surface 3A.

Escape of the high Z gas from the gap A through the groove 5 is prevented due to the provision of the connector 9 and fastening means 10, 12 because the wall 7B of the section 7 is held in sealing engagement with the surface 5a in that portion of the groove 5 which is remotest from the clearance 1. As mentioned above, the connector 9 exhibits the additional advantage that it fills the compartment 7A in the deflated condition of the section 7 so that the section 7 begins to expand (to thereby move the section 8 and its insert 13 toward the surface 3A) as soon as the compartment 7A begins to receive pressurized fluid. In other words, fluid which is supplied by the pump or pumps P need not completely fill that portion of the compartment 7A which contains the connector 9. This insures rapid sealing action and further insures that one or more relatively small pumps can rapidly supply requisite quantities of pressurized fluid to move the lip 14 and the upper wall of the section 8 into sealing engagement with the surface 3A. The insert 13 enhances the stability of the aforementioned plunger or ram which further includes the section 8 of the seal 6. Consequently, the plunger can properly seal the gap A from the space B even if the pressure differential between A and B is very pronounced.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the claims.

I claim:

1. A device for sealing a clearance between a first space and a second space wherein the pressure exceeds, at least at times, the pressure in said first space, particularly for sealingly separating the interelectrode gap of an ionography imaging chamber from the surrounding atmosphere, comprising first and second members respectively having first and second surfaces disposed at the opposite sides of and flanking said clearance, the surface of one of said members having a recess extending substantially transversely of said clearance; a seal mounted in said recess and including a deformable hollow tubular first section which is remote from said clearance and completely surrounds an enclosed internal compartment, and a second section which is nearer to said clearance and is movable in said recess toward and away from the surface of the other of said members; means for holding said tubular first section in said recess, including a solid connector fully accommodated in said enclosed internal compartment of said first section of said seal; and means for selectively admitting a pressurized fluid into said internal compartment of said first section to thereby inflate said first section with attendant movement of said second section across said clearance and into sealing engagement with the surface of said other member.

2. The device of claim 1, wherein said second section is a plunger which is reciprocable in said recess in response to inflation and deflation of said first section.

3. The device of claim 1, wherein said internal compartment is substantially filled by said connector in deflated condition of said first section.

4. The device of claim 1, further comprising means for fastening said connector to said one member.

5. The device of claim 4, wherein said fastening means comprises threaded members secured to said connector and extending through said first section.

6. The device of claim 4, wherein said recess has a portion remotest from said clearance and said one member has a bottom surface adjacent to said portion of said recess, said fastening means including a plurality of fastening members maintaining a portion of said first section in sealing engagement with said bottom surface.

7. The device of claim 2, wherein said second section comprises a hollow tubular portion consisting of elastomeric material and a substantially rigid reinforcing insert in said hollow tubular portion.

8. The device of claim 2, wherein said clearance has a predetermined width in deflated condition of said first section and the thickness of said second section, as considered at right angles to said surfaces, is at least twice said width.

9. The device of claim 2, wherein said clearance has a predetermined width in deflated condition of said first section and the width of said second section, as considered transversely of said recess, at least equals said predetermined width.

10. The device of claim 2, wherein said seal has a substantially rectangular cross-sectional outline.

11. The device of claim 2, wherein said second section has an elastic lip adjacent to said second space and sealingly engaging said surface of said other member in inflated condition of said first section.

12. The device of claim 2, wherein said recess has a predetermined depth, as considered at right angles to said surfaces, and the thickness of said seal, as considered at right angles to said surfaces, at most equals said depth in deflated condition of said first section.

13. The device of claim 2, wherein said recess has a predetermined width and the width of said seal in deflated condition of said first section is slightly less than the width of said recess.

14. The device of claim 2, wherein said recess is a circumferentially complete groove and said seal is a circumferentially complete frame-like body surrounding said second space.

* * * * *